(12) United States Patent
Sultana et al.

(10) Patent No.: US 12,460,582 B2
(45) Date of Patent: Nov. 4, 2025

(54) ASSEMBLY FOR A TURBINE ENGINE

(71) Applicant: SAFRAN AIRCRAFT ENGINES, Paris (FR)

(72) Inventors: Patrick Jean Laurent Sultana, Moissy-Cramayel (FR); Stéphane Pierre Guillaume Blanchard, Moissy-Cramayel (FR); Antoine Hervé Dos Santos, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/763,095

(22) PCT Filed: Sep. 21, 2020

(86) PCT No.: PCT/FR2020/051632
§ 371 (c)(1),
(2) Date: Mar. 23, 2022

(87) PCT Pub. No.: WO2021/058898
PCT Pub. Date: Apr. 1, 2021

(65) Prior Publication Data
US 2022/0389874 A1    Dec. 8, 2022

(30) Foreign Application Priority Data

Sep. 23, 2019  (FR) ..................... 1910480

(51) Int. Cl.
*F02C 7/36* (2006.01)
*F01D 5/02* (2006.01)
(Continued)

(52) U.S. Cl.
CPC ............... *F02C 7/36* (2013.01); *F01D 5/026* (2013.01); *F01D 5/10* (2013.01); *F01D 25/04* (2013.01);
(Continued)

(58) Field of Classification Search
CPC .. F02C 7/36; F05D 2230/64; F05D 2230/644; F05D 2240/61; F05D 2250/231;
(Continued)

(56) References Cited

U.S. PATENT DOCUMENTS 233,225 A * 10/1880 Fontaine ............... F16D 1/05
403/304
1,758,692 A * 5/1930 England ............... F16D 1/097
74/443
(Continued)

FOREIGN PATENT DOCUMENTS

DE      3237096 A  *  4/1982  ............. F16B 2/005
EP      3524776 A1     8/2019
(Continued)

OTHER PUBLICATIONS

International Patent Application No. PCT/FR2020/051632, International Search Report and Written Opinion dated Jan. 13, 2021, 16 pgs.
(Continued)

*Primary Examiner* — Courtney D Heinle
*Assistant Examiner* — Jesse M Prager
(74) *Attorney, Agent, or Firm* — Cozen O'Connor

(57) ABSTRACT

The invention relates to an assembly for a turbine engine, comprising a radially inner shaft (3) and a radially outer shaft (7), said shafts (7, 8) being coaxial and extending along an axis (X), means (11, 15) for coupling said inner and outer shafts (7, 8) in rotation, means (22) for axially holding the inner shaft (8) relative to the outer shaft (7), means for centring the inner shaft (8) relative to the outer shaft (7), characterised in that the centring means comprise a shim (14) for radial centring and for axial positioning, this shim being frustoconical and interposed between a frustoconical
(Continued)

centring surface (13) of the inner shaft (8) and a corresponding frustoconical centring surface (10) of the outer shaft (7).

14 Claims, 2 Drawing Sheets

(51) Int. Cl.
*F01D 5/10* (2006.01)
*F01D 25/04* (2006.01)

(52) U.S. Cl.
CPC .... *F05D 2230/644* (2013.01); *F05D 2240/61* (2013.01); *F05D 2250/231* (2013.01); *F05D 2250/232* (2013.01); *F05D 2260/31* (2013.01); *F05D 2260/36* (2013.01); *F05D 2260/96* (2013.01)

(58) Field of Classification Search
CPC ........... F05D 2250/232; F05D 2260/31; F05D 2260/36; F05D 2260/96; F05D 2260/403; F01D 5/025; F01D 5/026; F01D 5/10; F01D 25/04; F16D 1/09; F16D 1/092; F16D 1/093; Y10T 403/1616; Y10T 403/1624; Y10T 403/7058
See application file for complete search history.

(56) References Cited

U.S. PATENT DOCUMENTS

| | | | | |
|---|---|---|---|---|
| 2,239,641 A * | 4/1941 | Bierend | ................ | F16D 1/0835 |
| | | | | 277/615 |
| 3,355,201 A * | 11/1967 | Roy | ....................... | F16D 1/097 |
| | | | | 174/176 |
| 3,358,772 A * | 12/1967 | Bunyan | ..................... | F16D 1/09 |
| | | | | 416/174 |
| 3,900,270 A | 8/1975 | Rhodes | | |
| 5,580,183 A | 12/1996 | Brackoneski | | |
| 9,261,112 B2 * | 2/2016 | Stoughton | ............. | F04D 29/329 |
| 2007/0237646 A1* | 10/2007 | Shi | .......................... | F01D 5/025 |
| | | | | 416/244 A |
| 2010/0129222 A1* | 5/2010 | Hidding | .................. | F03D 15/00 |
| | | | | 403/337 |
| 2019/0218921 A1* | 7/2019 | Breen | ..................... | F01D 5/025 |

FOREIGN PATENT DOCUMENTS

| | | | |
|---|---|---|---|
| FR | 2244934 A1 | 4/1975 | |
| FR | 2975449 A1 * | 11/2012 | ............. F01D 5/026 |
| WO | WO 2013153339 A1 | 10/2013 | |

OTHER PUBLICATIONS

French Patent Application No. 1910480; Search Report dated Jun. 12, 2020; 8 pgs.

* cited by examiner

ASSEMBLY FOR A TURBINE ENGINE

CROSS-REFERENCE TO RELATED APPLICATIONS

This application is a 35 U.S.C. § 371 filing of International Application No. PCT/FR2020/051632 filed Sep. 21, 2020, which claims the benefit of priority to French Patent Application No. 1910480 filed Sep. 23, 2019, each of which is incorporated herein by reference in its entirety.

TECHNICAL FIELD OF THE INVENTION

The invention relates to an assembly for a turbomachine, such as an aircraft turbojet or turboprop engine.

PRIOR ART

FR 3 066 552 in the name of the Applicant discloses a turbomachine extending about an axis and having a shaft referred to as a low-pressure compressor shaft, a fan having a radially inner coupling zone rotatably coupled to said shaft by means of splines, and a low-pressure compressor rotor having a radially inner coupling zone rotatably coupled to said shaft by means of splines.

Each said coupling zone has a cylindrical part centred on a cylindrical part of the shaft. In addition, the coupling zone of the low-pressure compressor rotor is held in axial abutment towards downstream against a shaft end-stop. The coupling zone of the fan is held in axial abutment towards downstream on the upstream end of the coupling zone of the low-pressure compressor rotor. A nut is screwed onto the upstream end of the shaft. This nut exerts an axial force on the upstream end of the coupling zone of the fan. Thus, both coupling zones are held axially between the nut and the shaft end-stop.

It turns out that it is difficult to ensure precise centring of the coupling zones with respect to the low-pressure compressor shaft through the cylindrical centring parts. This can lead to unbalance, which causes harmful vibration phenomena during operation.

In order to improve such centring, it may be envisaged to shrink-fit the cylindrical centring parts of the coupling areas and the low-pressure compressor shaft. However, such shrink-fitting is difficult to carry out in the area concerned, particularly in view of the difficulties of access for the shrink-fitting tools to the parts concerned. In addition, the disassembly of the various shrink-fitted elements is difficult to implement, given the high forces or torques that must be applied to separate the shrink-fitted parts.

The invention aims to overcome these drawbacks in a simple, reliable and inexpensive way.

PRESENTATION OF THE INVENTION

For this purpose, the invention concerns an assembly for a turbomachine, comprising a radially inner shaft and a radially outer shaft, the said shafts being coaxial and extending along an axis, means for coupling the inner and outer shafts in rotation, means for axially holding the inner shaft with respect to the outer shaft, means for centring the inner shaft with respect to the outer shaft, characterised in that the centring means comprise a radial centring and axial positioning wedge of truncated cone shape, interposed between the inner shaft and the outer shaft, means for centring the inner shaft with respect to the outer shaft, characterised in that the centring means comprise a frustoconical radial centring and axial positioning wedge, inserted between a frustoconical centring surface of the inner shaft and a complementary frustoconical centring surface of the outer shaft.

The truncated cone shape of the centring surfaces and the wedge allow precise centring of the inner shaft with respect to the outer shaft.

The wedge and/or the corresponding frustoconical surfaces can be adapted depending on the dimensions and the axial and radial positioning of the inner shaft with respect to the outer shaft, so as to ensure that the two shafts are not only well centred with respect to each other, but also well positioned axially with respect to each other. Such adaptation can be achieved by machining the frustoconical surfaces of the shafts and/or the wedge, or by an appropriate choice of the dimensions of the wedge itself.

Such a structure makes it possible to improve the dynamic behaviour of the assembly in operation, so as to reduce, in particular, vibrations as well as unwanted dynamic behaviours such as asynchronous modes.

The frustoconical surfaces can be flared towards the downstream end of the turbomachine. The terms 'upstream' and 'downstream' are defined with respect to the gas flows through the turbomachine.

The wedge can be mounted at an upstream end of the inner shaft.

The means of centring can comprise a cylindrical centring surface formed radially outwardly of the inner shaft, the cylindrical centring surface cooperating with a complementary cylindrical centring surface formed radially inwardly of the outer shaft, said cylindrical centring surfaces being axially offset with respect to the frustoconical centring surfaces.

The presence of cylindrical centring surfaces improves the centring of the inner and outer shafts with respect to each other.

The cylindrical centring surfaces can be offset axially downstream with respect to the frustoconical centring surfaces.

The cylindrical centring surfaces may be offset axially downstream with respect to the rotational means of coupling of said shafts.

The wedge can be annular.

The wedge can be peelable so that some parts or frustoconical layers can be removed to vary the dimensions of the wedge and thus allow the wedge dimensions to be adjusted to the dimensions required to ensure accurate centring and axial positioning of the inner and outer shafts with respect to each other.

The wedge can have at least one mainly axially extending slot.

The presence of a slot allows the wedge to be deformed to conform to the actual shape of the frustoconical surfaces of the shafts, in the event that the wedge or said surfaces are not perfectly frustoconical.

The number of slots can be between 1 and 20.

Each slot can extend over an axial dimension of between 50% and 90% of the axial dimension of the wedge.

Said slot can have a first end opening axially at one axial end of the wedge and a second end located axially between the axial ends of the wedge.

The second end is therefore not open.

The slot opens out, for example, at the flared end of the wedge, for example the downstream end.

The second end of the slot can have a circular orifice with a diameter greater than a transverse dimension of the slot.

In other words, the rounded zone formed by the circular orifice at the second end of the slot is wider than the slot, which makes it possible to better distribute the stresses and avoid stress concentration effects that could lead to cracks or cracking within the wedge. Such a rounded zone is also called a discharge zone.

The axial means of retention can comprise at least one nut screwed onto a threaded part of the inner shaft or onto a threaded part of the outer shaft and axially abutting an axial end-stop surface of the outer shaft or the inner shaft respectively.

The nut is thus designed to prevent axial displacement, in a first axial direction, for example from upstream to downstream, of the inner shaft with respect to the outer shaft. The axial displacement of the inner shaft with respect to the outer shaft in a second, opposite direction, for example from downstream to upstream, can be prevented by any suitable means. The threaded portion may be formed on an inner surface of the inner shaft.

The bearing surface may be formed by an annular radial surface of the outer shaft. The angle of the frustoconical surfaces with respect to the axis can be between 1° and 45°. The rotational means of coupling of the inner and outer shafts may comprise splines.

The invention also relates to a turbomachine comprising, from upstream to downstream with respect to the direction of flow of the gases within the turbomachine, a fan, a high-pressure compressor, a low-pressure compressor, a combustion chamber, a high-pressure turbine and a low-pressure turbine, the low-pressure turbine being coupled in rotation to a first shaft, the fan being coupled in rotation to a second shaft, characterised in that it comprises an assembly of the aforementioned type, with the first shaft forming the inner shaft and the second shaft forming the outer shaft, or inversely.

The fan can be coupled to the second shaft directly or indirectly, via a gearbox.

The invention also relates to an aircraft comprising a turbomachine of the above type.

DETAILED DESCRIPTION OF THE INVENTION

Figure 1:
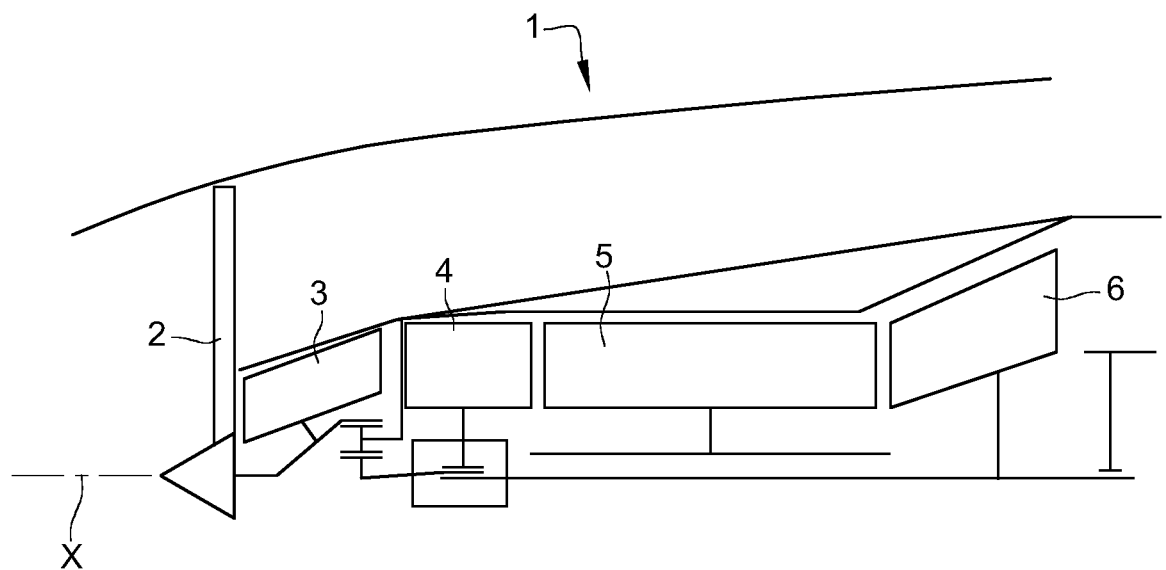
FIG. 1 is a schematic half view of a turbomachine according to the invention.

FIG. 1 shows the general structure of an X-axis turbomachine 1. This comprises, from upstream to downstream in the direction of air flow within the turbomachine 1, a fan 2, a low-pressure compressor 3, a high-pressure compressor 4, a combustion chamber (not shown), a high-pressure turbine 5 and a low-pressure turbine 6. The high-pressure compressor 4 and the high-pressure turbine 5 are connected via a high-pressure shaft and together form a high-pressure housing. The low-pressure compressor 3 and the low-pressure turbine 6 are also coupled in rotation.

Figure 2:
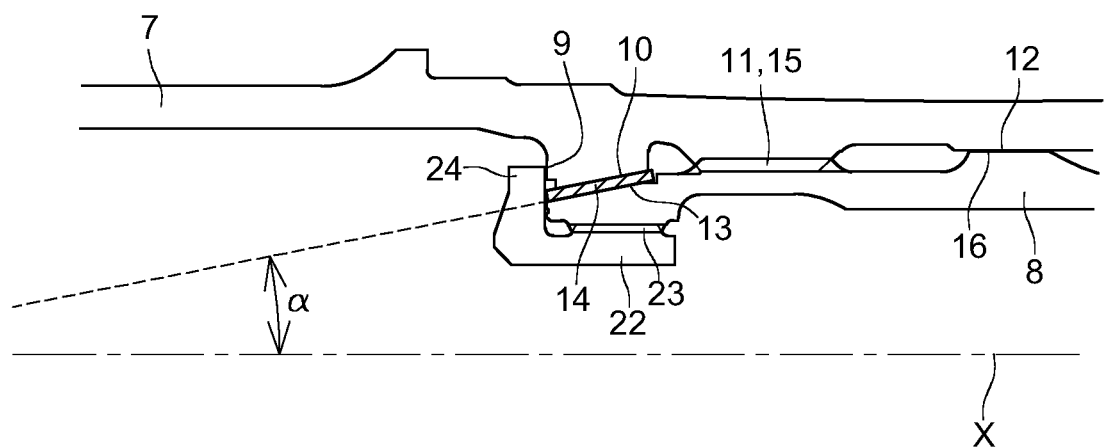
FIG. 2 is a half axial sectional view of a part of an assembly according to one embodiment of the invention.

Furthermore, as can be seen in FIG. 2, the rotor of the low-pressure compressor 3 has a shaft 7 and the rotor of the low-pressure turbine 6 has a shaft 8. These shafts 7, 8 are coaxial and are connected to the fan via a gearbox, e.g. an epicyclic gearbox.

In particular, FIG. 2 shows the assembly of the shaft 8 of the low-pressure turbine 6 and the shaft 7 of the low-pressure compressor 2.

The low-pressure compressor 3 shaft 7 extends radially outwards or around the low-pressure turbine shaft 8.

The radially inner surface of the low-pressure compressor 3 shaft 7, or outer shaft 7, has, in the area shown in FIG. 2 and from upstream to downstream, an annular radial shoulder 9, a frustoconical surface 10 flaring downstream, a rotational coupling zone with splines 11, and a cylindrical centring area 12. The diameter of the cylindrical area 12 is smaller than the diameter of the rotational coupling zone 11, which in turn is smaller than the smallest diameter of the truncated cone area 10.

The radially outer surface of the low-pressure turbine 6 shaft 8, or inner shaft 8, has, in the area shown in FIG. 2 and from upstream to downstream, a frustoconical surface 13 flaring downstream and cooperating with the frustoconical surface 10 of the outer shaft 7 by means of a frustoconical wedge 14, a rotational coupling zone comprising splines 15 cooperating with the splines 11 of the coupling zone of the external shaft 7, and a cylindrical centring zone 16 cooperating with the cylindrical zone 12 of the external shaft 7.

The splines 11, 15 of the inner and outer shafts 7, 8 ensure the rotational coupling of said shafts 7, 8. The cylindrical zones 12, 16 of the inner and outer shafts 7, 8 have approximately the same diameter, whereby a small amount of clearance can be provided for mounting if required.

The frustoconical wedge 14 is inserted radially between the frustoconical surfaces 10, 13 of the inner and outer shafts 7, 8.

The angle a of the frustoconical surfaces 10, 13 and the wedge 16 with respect to the axis X can be between 1 and 450.

The truncated cone shape of the centring surfaces 10, 13 and the wedge 14 allow precise centring of the inner shaft with respect to the outer shaft 7.

The wedge 14 and/or the corresponding frustoconical surfaces 10, 13 can be adapted depending on the dimensions and the axial and radial positioning of the inner shaft 8 with respect to the outer shaft, so as to ensure that the two shafts 7, 8 are not only well centred with respect to each other, but also well positioned axially with respect to each other. Such adaptation can be achieved by machining the frustoconical surfaces 10, 13 of the shafts 7, 8 and/or the wedge 14, or by an appropriate choice of the dimensions of the wedge itself.

Such a structure makes it possible to improve the dynamic behaviour of the assembly in operation, so as to reduce vibrations in particular.

Figure 3:
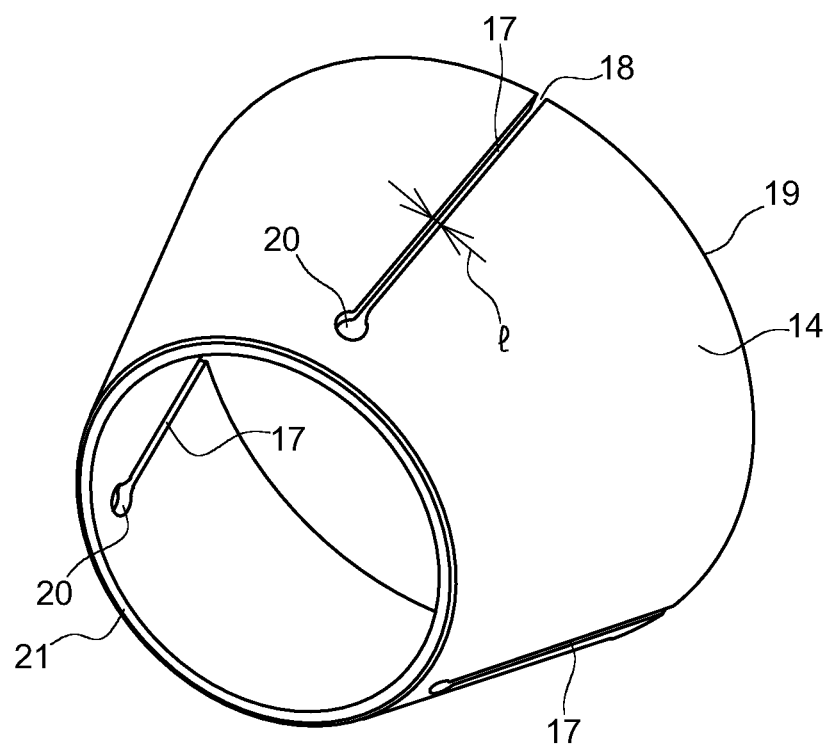
FIG. 3 is a perspective view of a wedge according to one embodiment of the invention.

As illustrated in FIG. 3, the wedge 14 has slots 7 extending axially over part of the axial dimension of the wedge 14. The number of slots 7 is equal to three but can vary according to need.

The presence of a slot 7 allows the wedge 14 to be deformed to conform to the actual shape of the frustoconical surfaces 10, 13 of the shafts 7, 8, in the event that the wedge 14 or said surfaces 10, 13 are not perfectly frustoconical.

Each slot 17 has a first end 18 that opens axially at the downstream end 19 of the wedge 14 and a second end 20 that is not open, located axially between the axial ends 19, 21 of the wedge 14.

Each slot 17 can extend over an axial dimension of between 50% and 90% of the axial dimension of the wedge 14.

The second end 20 of the slot 17 is rounded and has a radius of curvature greater than half the width I or transverse dimension of the slot 17, the width or transverse dimension being taken along a circumferential direction of the wedge 14.

The rounded zone formed at the second end 20 of the slot 17 is wider than the slot 17, which makes it possible to distribute the stresses more evenly and to avoid stress concentration effects that could lead to cracks or cracking within the wedge 14. Such a rounded zone 20 is also called a discharge zone.

A nut 22 is screwed onto a threaded portion 23 of the upstream end of the inner shaft 8. The threaded portion 23 is formed on the radially inner surface of the inner shaft 8. The upstream end 24 of the nut 22 extends radially and comes to bear on the radial shoulder 9 of the outer shaft 7.

The nut 22 is thus designed to prevent axial displacement, in a first axial direction, for example from upstream to downstream, of the inner shaft 8 with respect to the outer shaft 7. The axial displacement of the inner shaft 8 with respect to the outer shaft 7 in a second, opposite direction, e.g. from downstream to upstream, can be prevented by any suitable means, for example by an axial end-stop of the inner shaft 8 on the outer shaft 7.

The invention claimed is:

1. A turbomachine (1) comprising, from upstream to downstream with respect to the direction of gas flow within the turbomachine (1):
   a fan (2);
   a high-pressure compressor (3);
   a low-pressure compressor (4);
   a combustion chamber;
   a high-pressure turbine (5);
   a low-pressure turbine (6);
   an assembly extending about an axis (X), comprising:
      a radially inner shaft (8) rotatably coupled to the low-pressure turbine (6);
      a radially outer shaft (7) rotatably coupled to the fan (2), said shafts (7, 8) being coaxial and extending along the axis (X);
      means (11, 15) for coupling the inner and outer shafts (7, 8) in terms of rotation;
      means (22) for axially holding the inner shaft (8) with respect to the outer shaft (7); and
      means for centering the inner shaft (7) with respect to the outer shaft (8);
      wherein the means of centering comprise a frustoconical radial centering and axial positioning wedge (14) inserted between a frustoconical centering surface (13) of the inner shaft (7) and a complementary frustoconical centering surface (10) of the outer shaft (8),
      wherein said frustoconical radial centering and axial positioning wedge (14) is separate from the inner shaft and outer shaft and comprises two parallel frustoconical surfaces respectively in contact with the complementary frustoconical centering surface (13) of the inner shaft (7) and in contact with the complementary frustoconical centering surface (10) of the outer shaft (8),
      wherein the axial positioning wedge (14) has at least one mainly axially extending slot (17), and
      wherein the at least one mainly axially extending slot (17) comprises:
         a first end (18) opening axially at the level of a downstream axial end (19) of the axial positioning wedge (14); and
         a second end (20) situated axially between the downstream axial end (19) and a second end (21) of the axial positioning wedge (14).

2. The turbomachine according to claim 1, wherein the means of centering comprises a cylindrical centering surface (16) formed radially outwardly of the inner shaft (8), the cylindrical centering surface (16) cooperating with a complementary cylindrical centering surface (12) formed radially inwardly of the outer shaft (7), said cylindrical centering surfaces (16, 12) being axially offset with respect to the frustoconical centering surfaces (10, 13).

3. The turbomachine according to claim 1, wherein the axial positioning wedge (14) is annular.

4. The turbomachine according to claim 1, wherein the second end (20) of the at least one mainly axially extending slot (17) has a circular orifice with a diameter greater than a transverse dimension of the at least one mainly axially extending slot.

5. The turbomachine according to claim 1, wherein the means for axially holding comprise:
   at least one nut (22) screwed onto a threaded part (23) of the inner shaft (8) and coming to bear axially on an axial end-stop surface (9) of the outer shaft (7).

6. The turbomachine according to claim 1, wherein the angle of the frustoconical centering surface (13) of the inner shaft and the angle of the complementary frustoconical centering surface (10) with respect to the axis (X) is between 1 and 45°.

7. The turbomachine according to claim 1, wherein the means for coupling the inner and outer shafts (11, 15) have splines.

8. A turbomachine (1) comprising, from upstream to downstream with respect to the direction of gas flow within the turbomachine (1):
   a fan (2);
   a high-pressure compressor (3);
   a low-pressure compressor (4);
   a combustion chamber;
   a high-pressure turbine (5);
   a low-pressure turbine (6); and
   an assembly extending about an axis (X), comprising:
      a radially outer shaft (7) rotatably coupled to the low-pressure turbine (6);
      a radially inner shaft (8) rotatably coupled to the fan (2), said shafts (7, 8) being coaxial and extending along the axis (X);
      means (11, 15) for coupling the inner and outer shafts (7, 8) in terms of rotation;
      means (22) for axially holding the inner shaft (8) with respect to the outer shaft (7); and
      means for centering the inner shaft (8) with respect to the outer shaft (7);
      wherein the means of centering comprise a frustoconical radial centering and axial positioning wedge (14) inserted between a frustoconical centering surface (13) of the inner shaft (8) and a complementary frustoconical centering surface (10) of the outer shaft (7),
      wherein said frustoconical radial centering and axial positioning wedge (14) is separate from the inner shaft and outer shaft and comprises two parallel frustoconical surfaces respectively in contact with the complementary frustoconical centering surface (13) of the inner shaft (7) and in contact with the complementary frustoconical centering surface (10) of the outer shaft (8), wherein the axial positioning wedge (14) has at least one mainly axially extending slot (17), and wherein the at least one mainly axially extending slot (17) comprises:

a first end (18) opening axially at the level of a downstream axial end (19) of the axial positioning wedge (14); and a second end (20) situated axially between the downstream axial end (19) and a second end (21) of the axial positioning wedge (14).

9. The turbomachine according to claim 8, wherein the means of centering comprises a cylindrical centering surface (16) formed radially outwardly of the inner shaft (8), the cylindrical centering surface (16) cooperating with a complementary cylindrical centering surface (12) formed radially inwardly of the outer shaft (7), said cylindrical centering surfaces (16, 12) being axially offset with respect to the frustoconical centering surfaces (10, 13).

10. The turbomachine according to claim 8, wherein the axial positioning wedge (14) is annular.

11. The turbomachine according to claim 8, wherein the second end (20) of the at least one mainly axially extending slot (17) has a circular orifice with a diameter greater than a transverse dimension of the at least one mainly axially extending slot.

12. The turbomachine according to claim 8, wherein the means for axially holding comprise:

at least one nut (22) screwed onto a threaded part (23) of the inner shaft (8) and coming to bear axially on an axial end-stop surface (9) of the outer shaft (7).

13. The turbomachine according to claim 8, wherein the angle of the frustoconical centering surface (13) of the inner shaft and the angle of the complementary frustoconical centering surface (10) with respect to the axis (X) is between 1 and 45°.

14. The turbomachine according to claim 8, wherein the means for coupling the inner and outer shafts (11, 15) have splines.

\* \* \* \* \*